Figure 7:
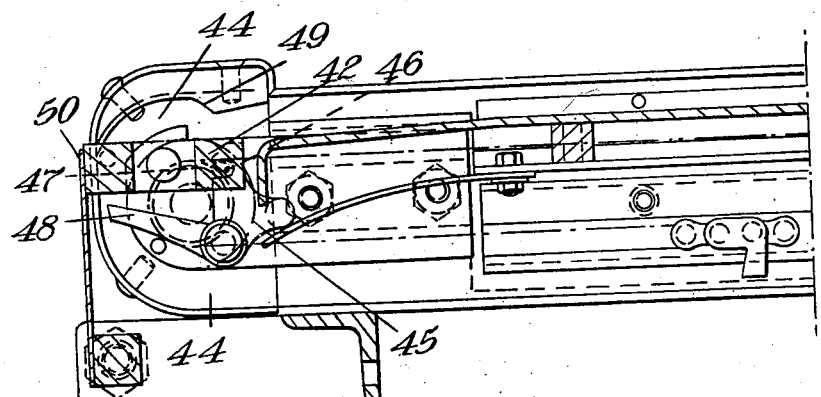

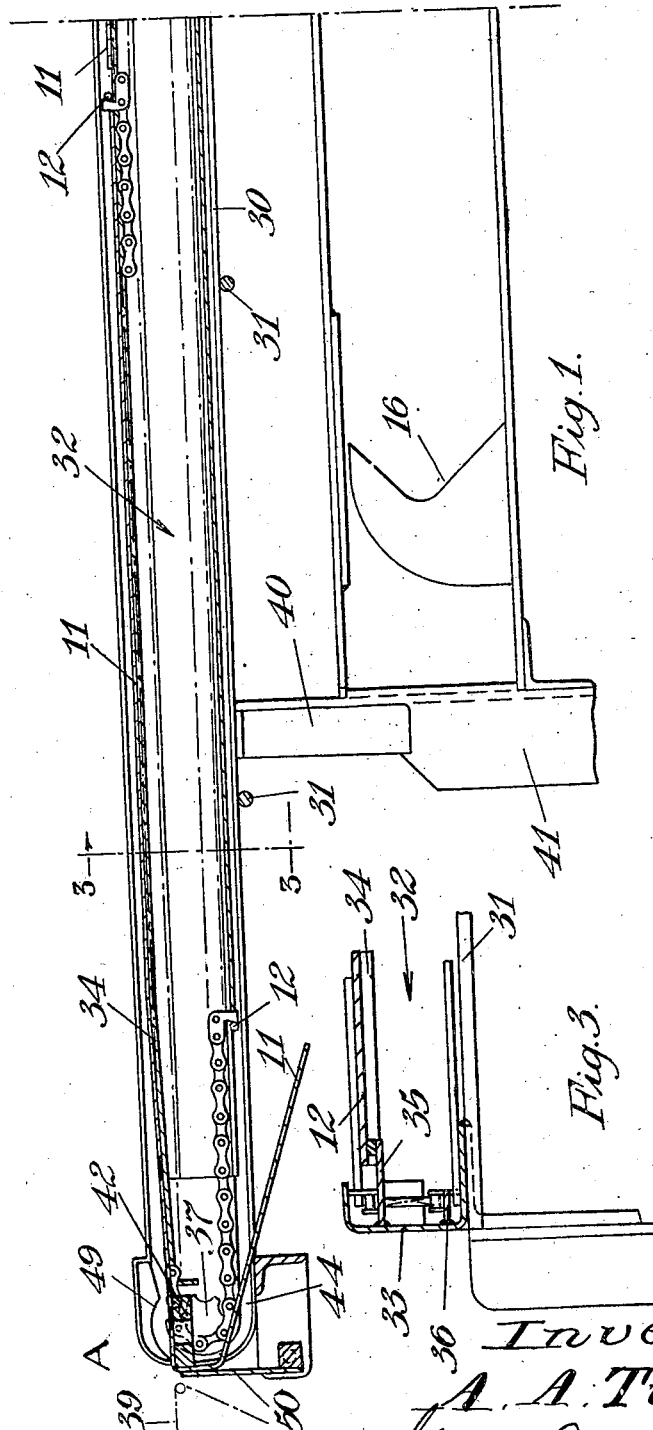

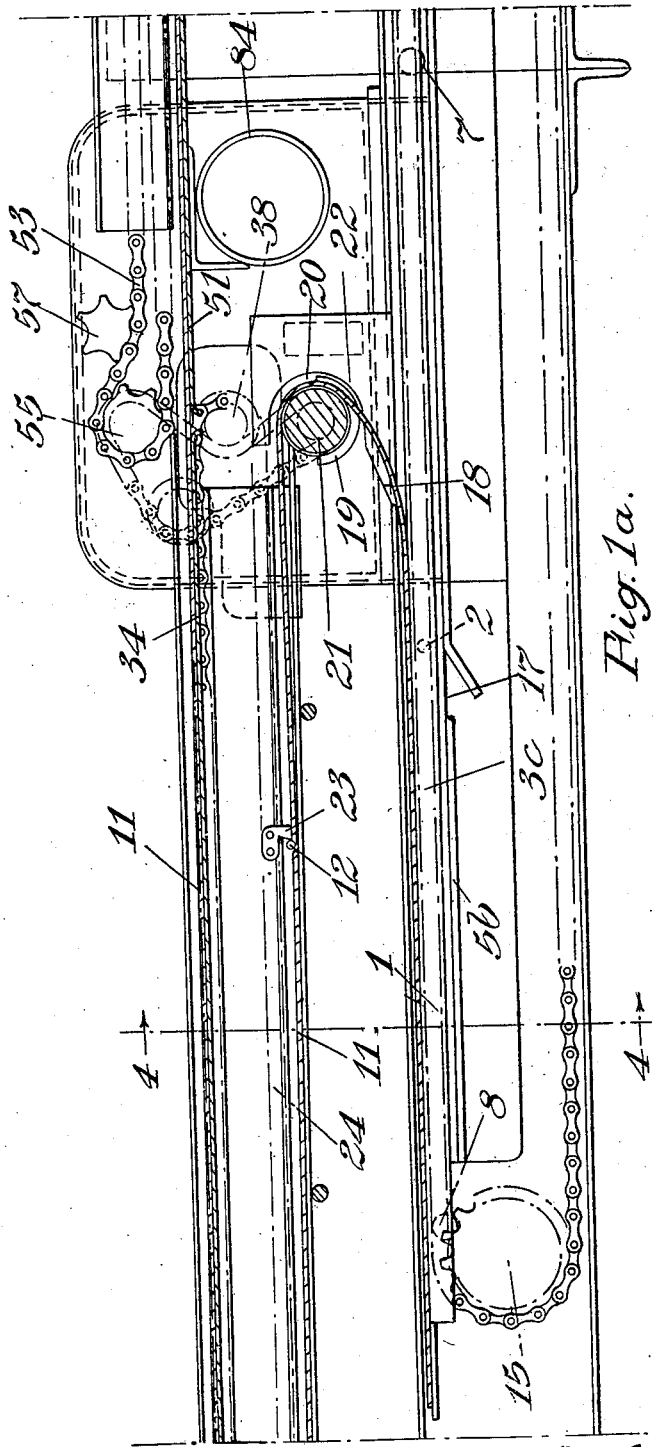

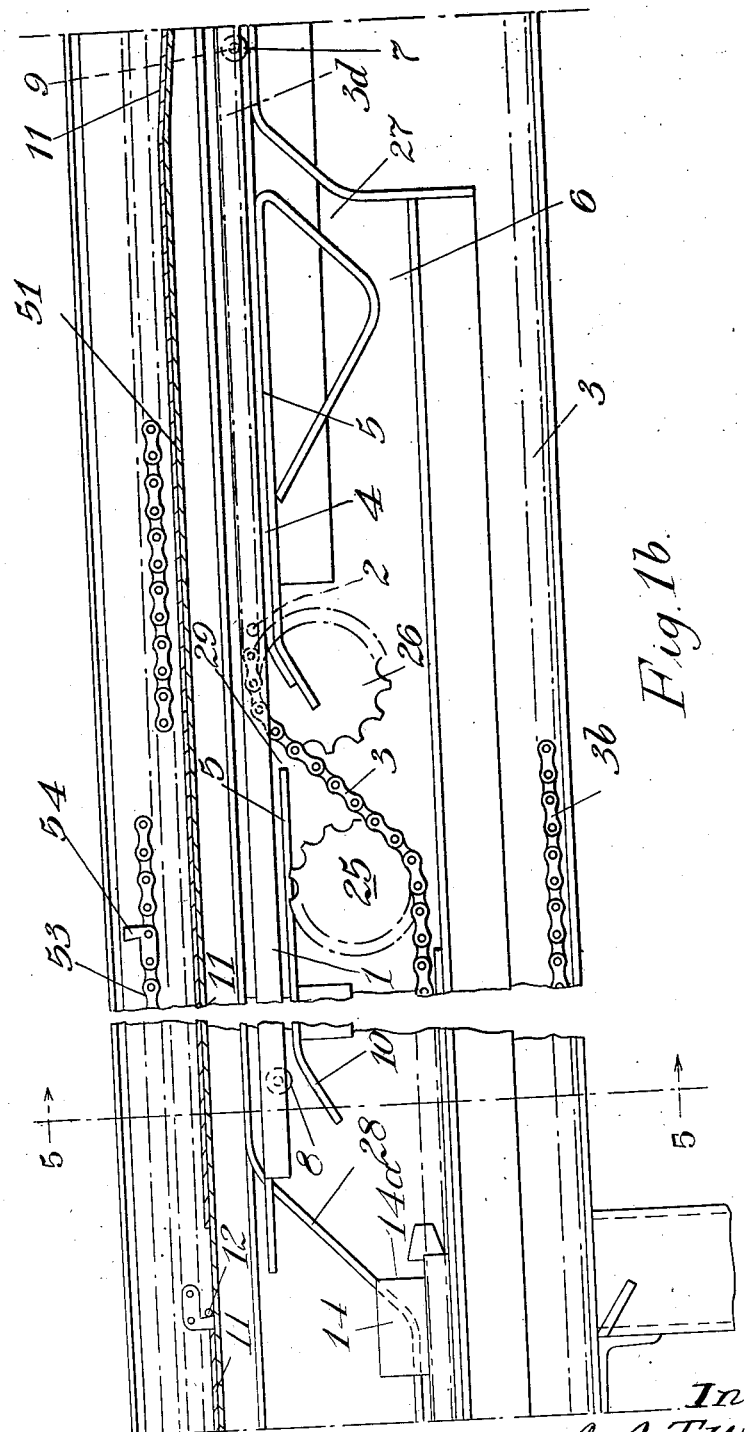

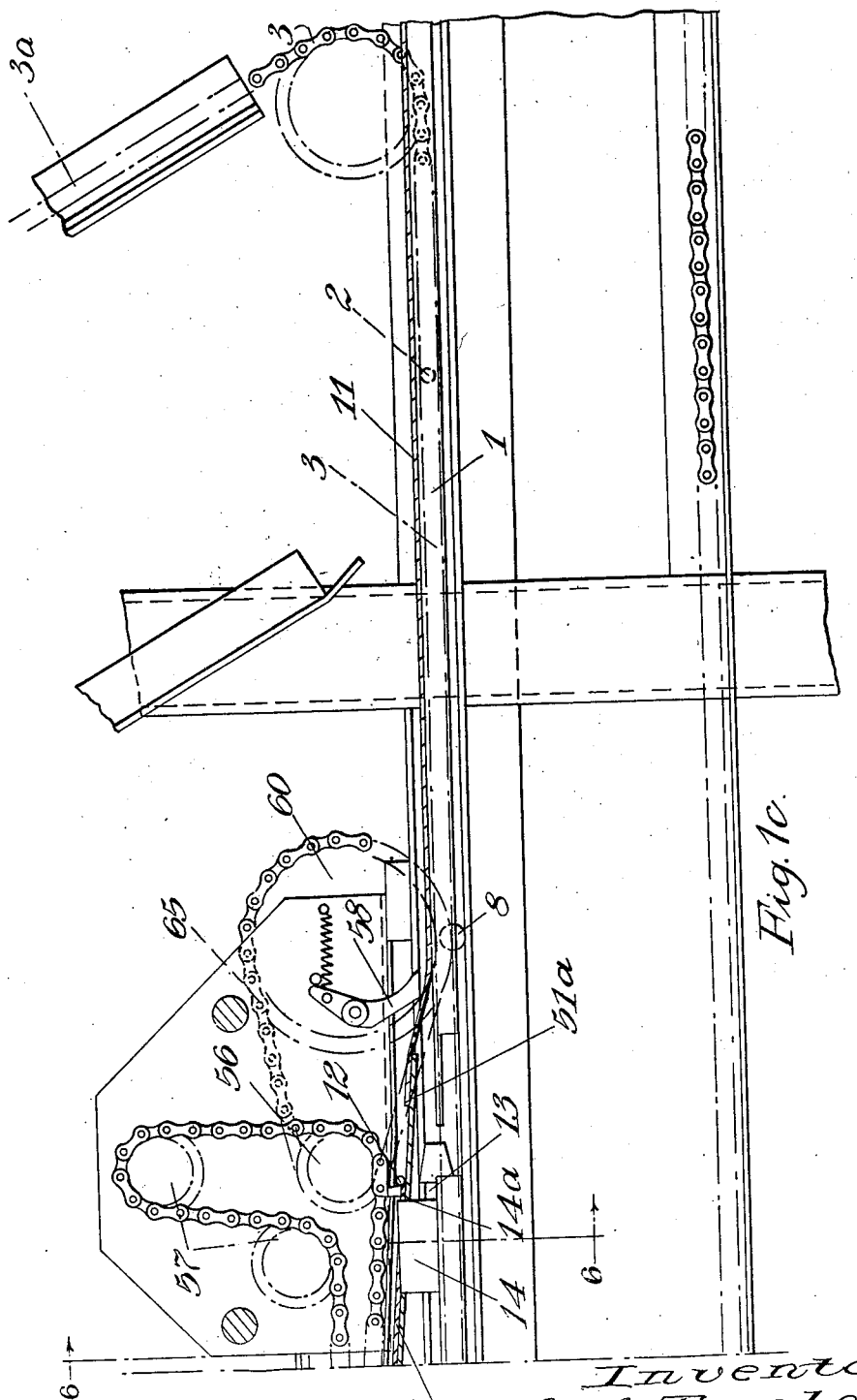

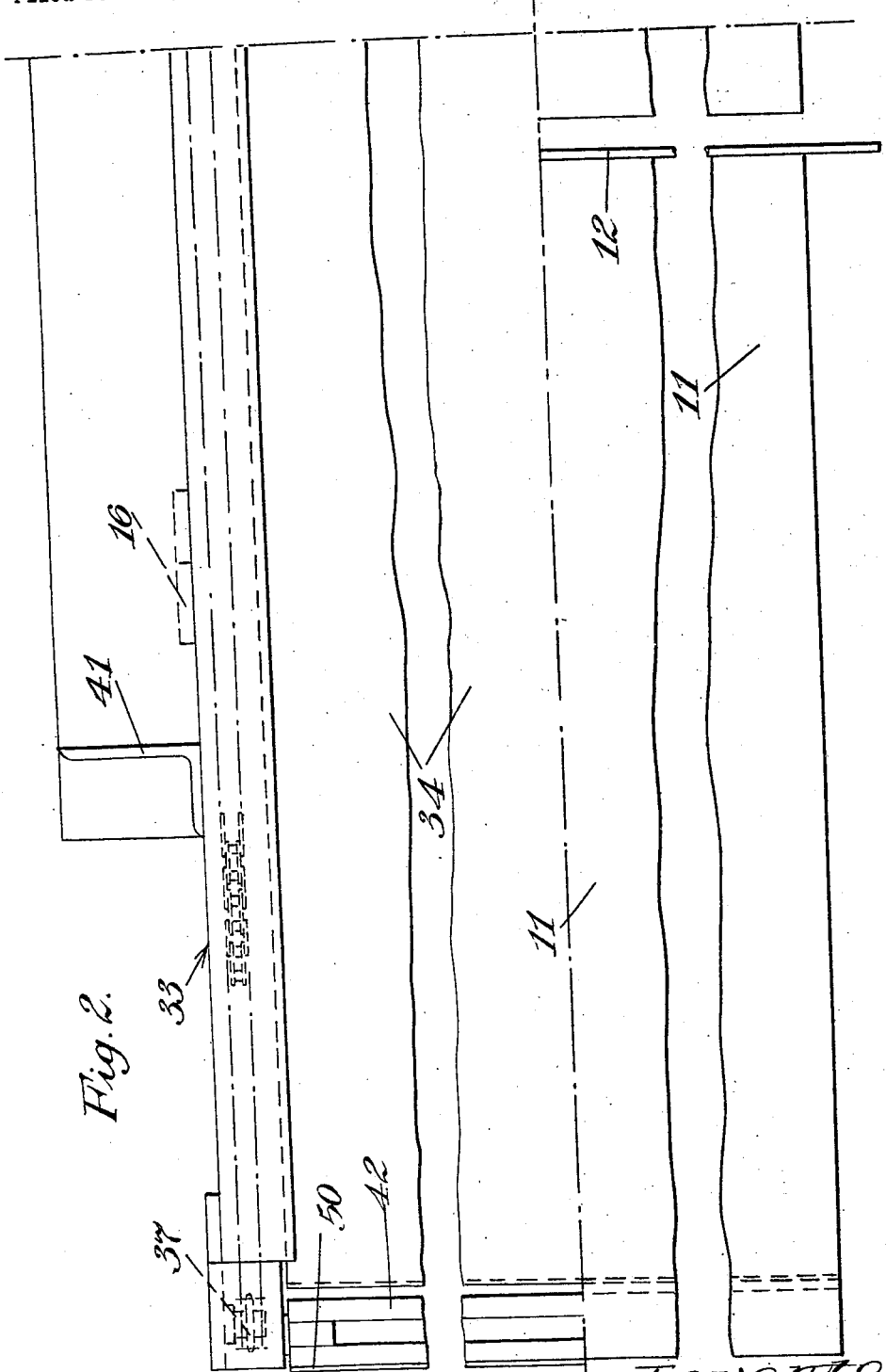

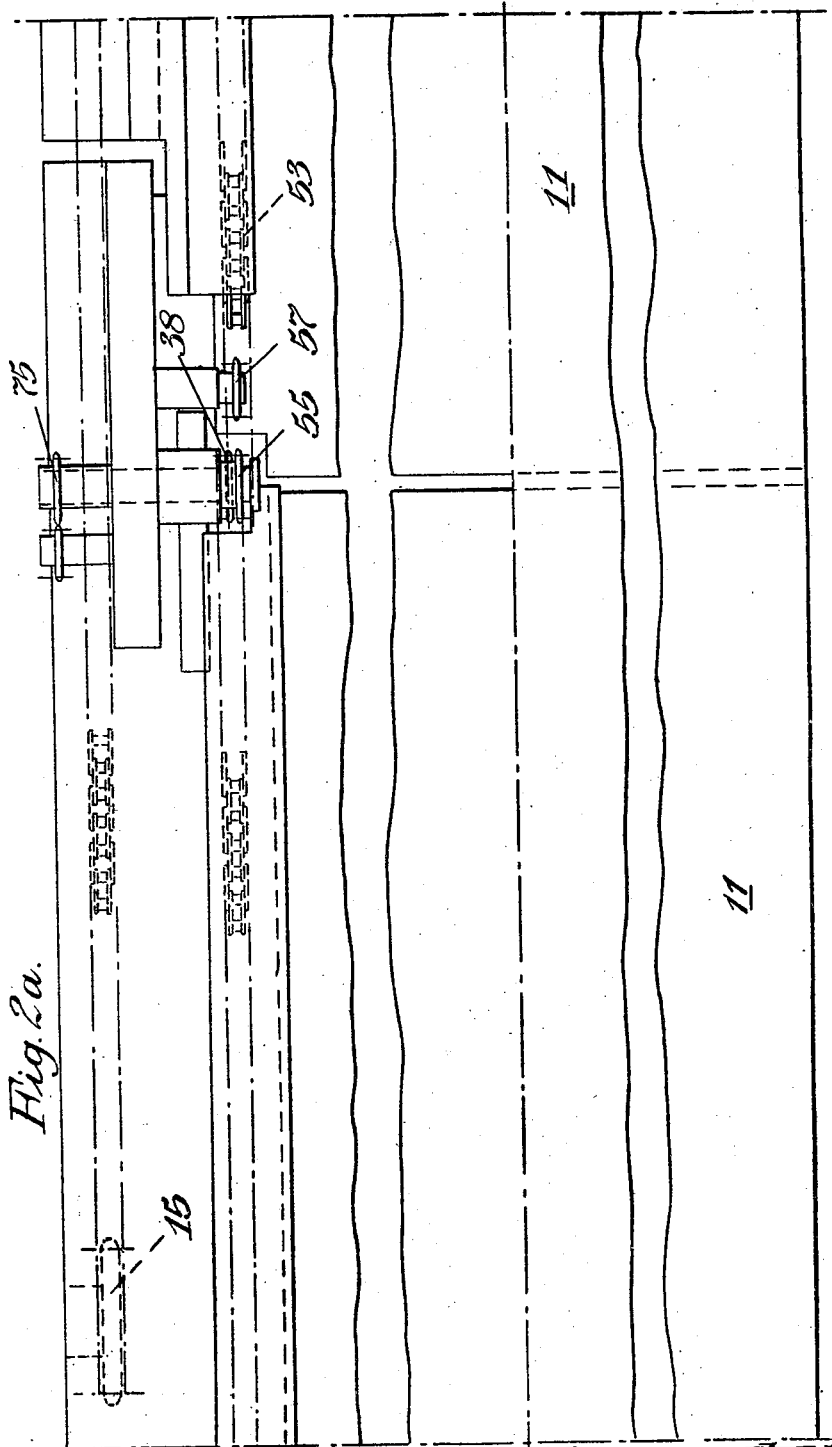

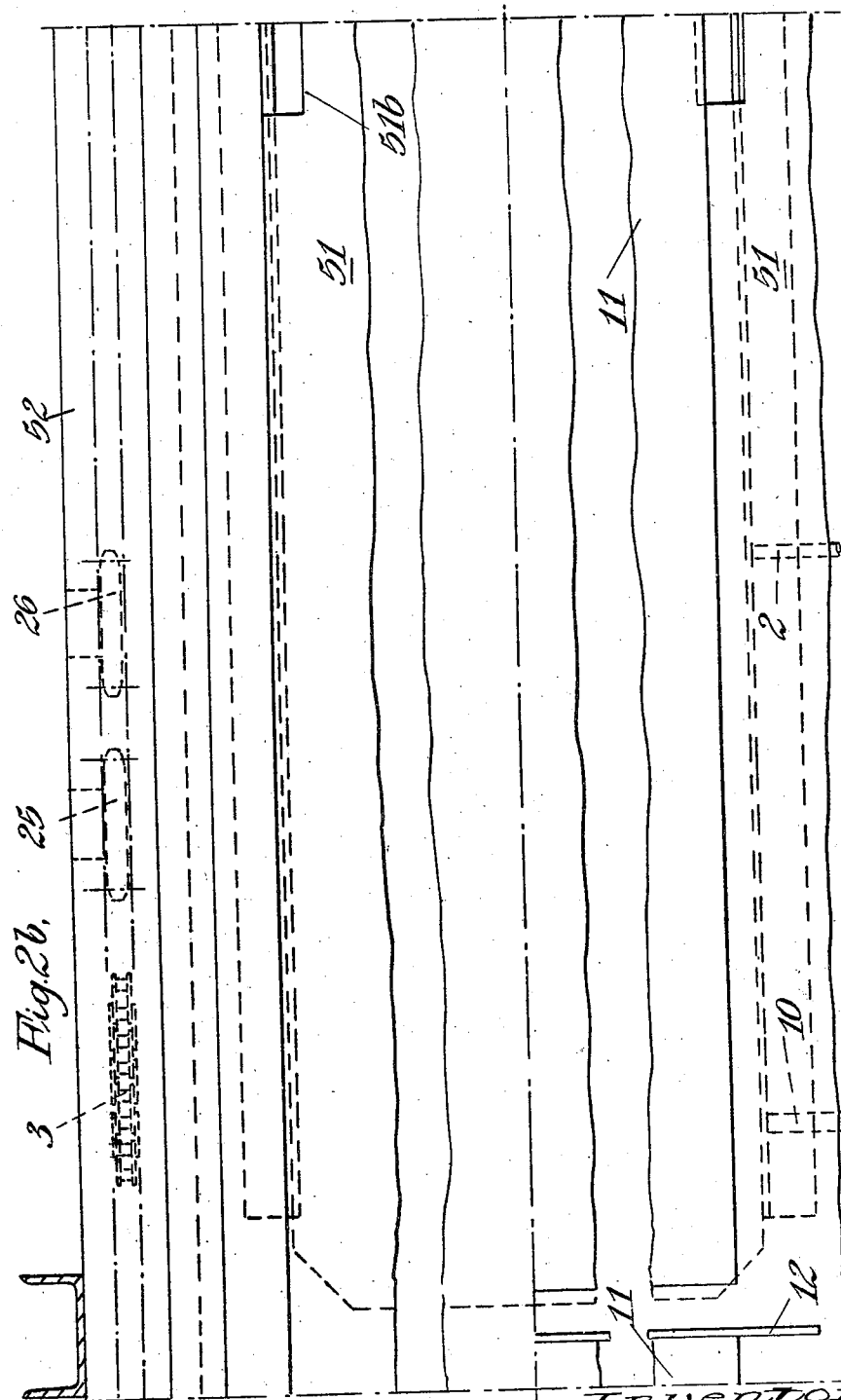

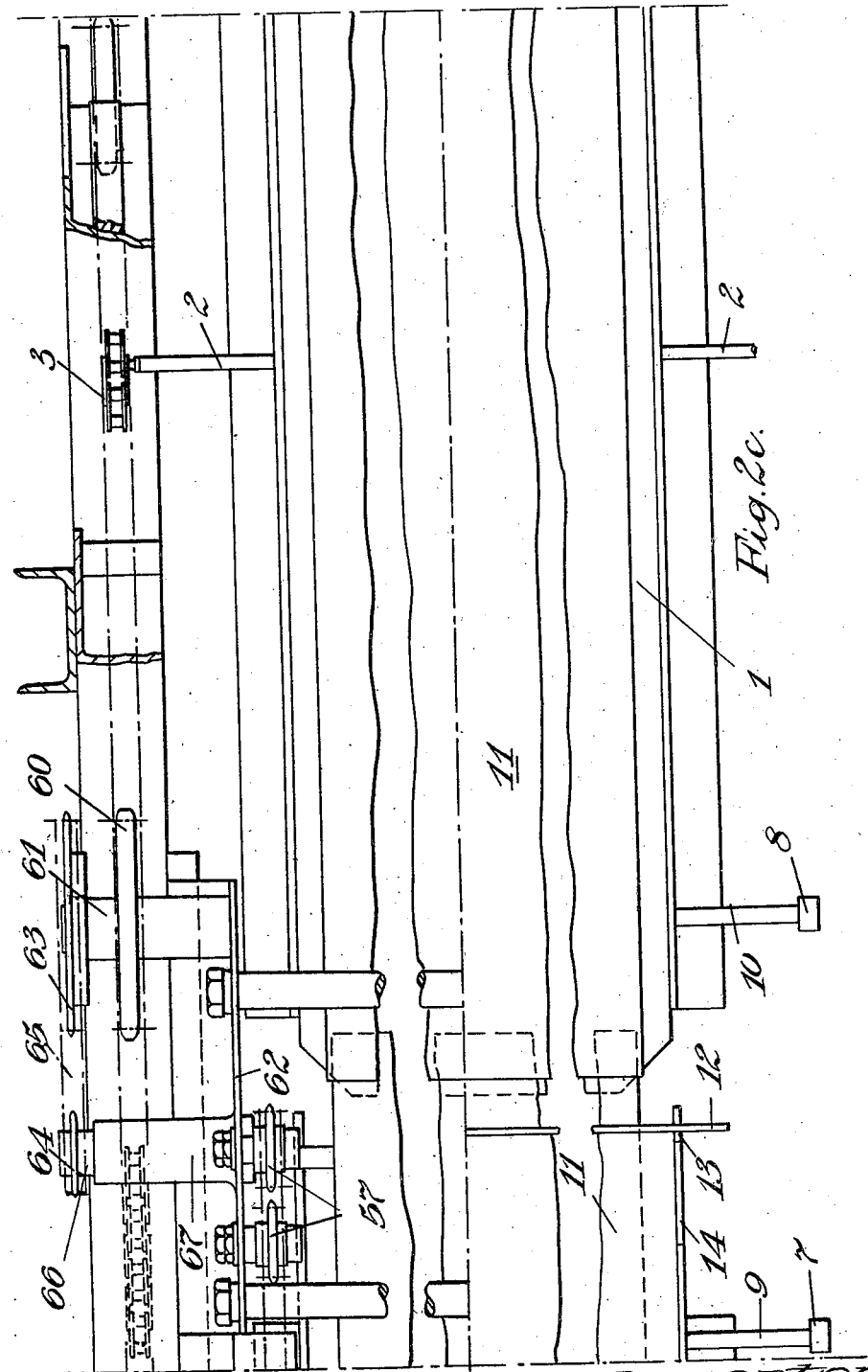

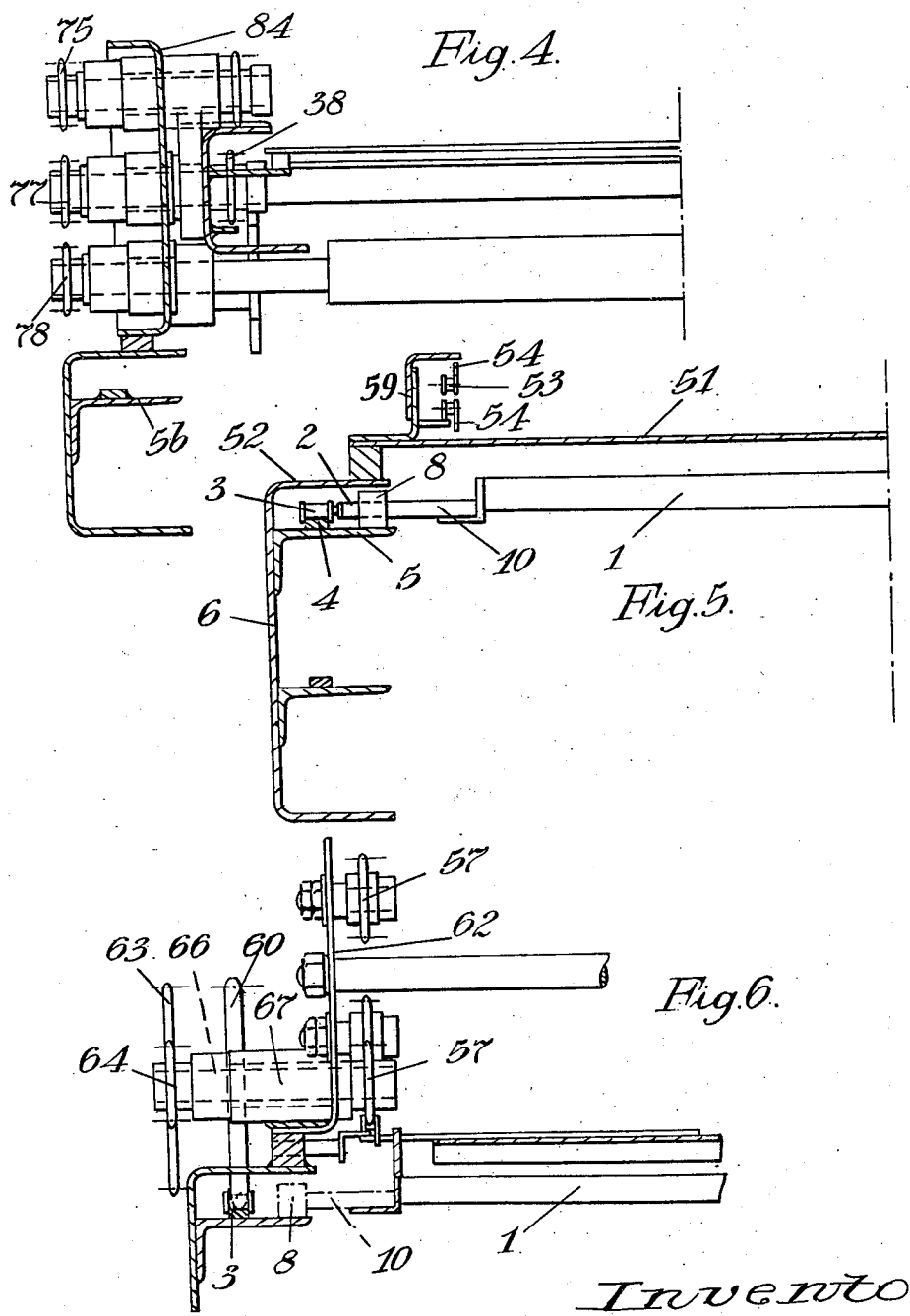

Nov. 15, 1949 A. A. TUNLEY 2,488,104
TRANSPORT OF GOODS FROM A CHOCOLATE
COATING OR LIKE MACHINE TO A COOLER
Filed Dec. 12, 1945 14 Sheets-Sheet 10

Inventor
A. A. Tunley
By Haseltine Downing Auerbach
Attys.

Nov. 15, 1949

A. A. TUNLEY 2,488,104

TRANSPORT OF GOODS FROM A CHOCOLATE
COATING OR LIKE MACHINE TO A COOLER

Filed Dec. 12, 1945

14 Sheets-Sheet 13

Inventor
A. A. Tunley
By Glascock Downing Seebold
Attys.

Nov. 15, 1949            A. A. TUNLEY            2,488,104
TRANSPORT OF GOODS FROM A CHOCOLATE
COATING OR LIKE MACHINE TO A COOLER
Filed Dec. 12, 1945            14 Sheets-Sheet 14
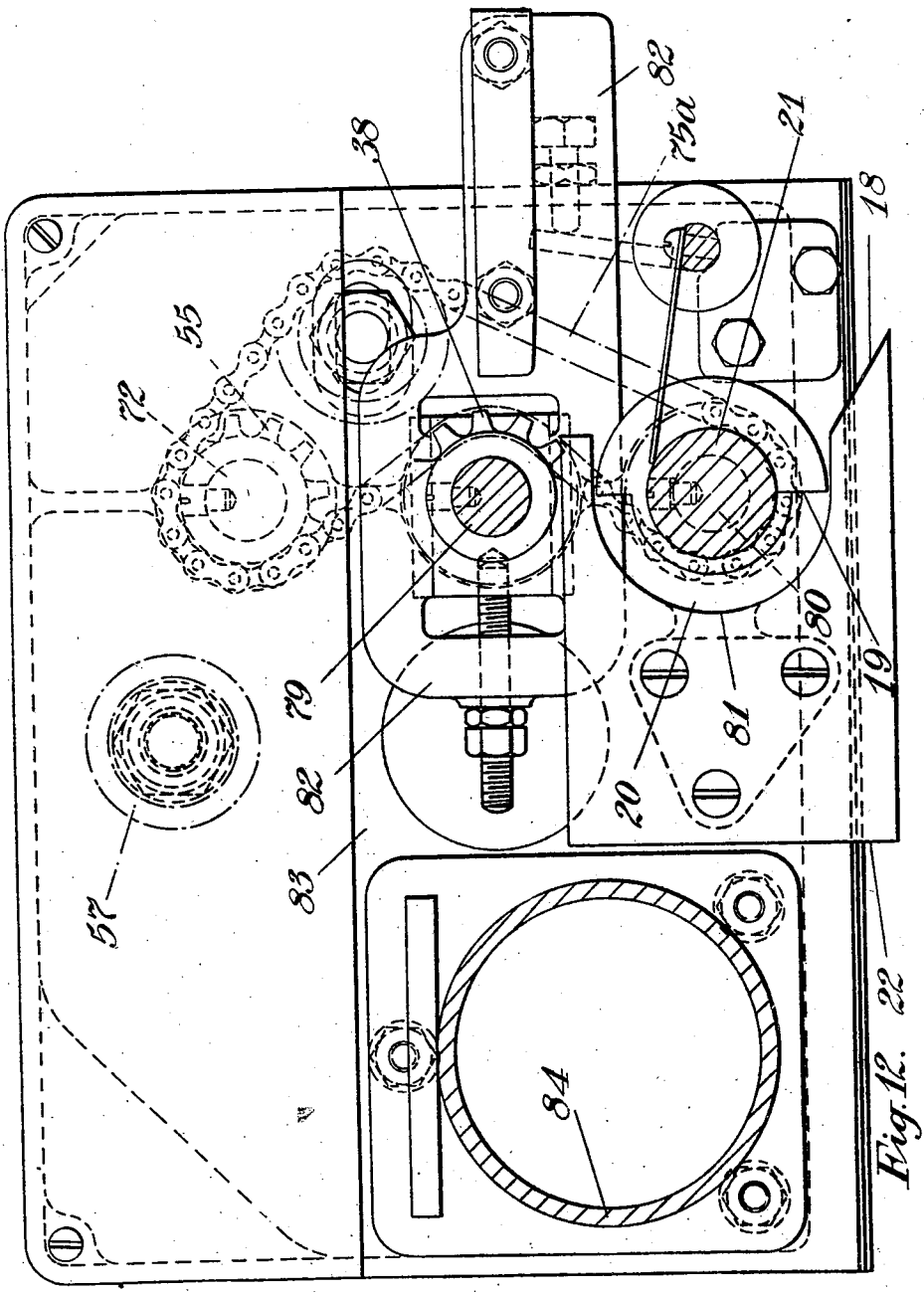
Inventor
A. A. Tunley Patented Nov. 15, 1949

2,488,104

UNITED STATES PATENT OFFICE 2,488,104

TRANSPORT OF GOODS FROM A CHOCOLATE COATING OR LIKE MACHINE TO A COOLER

Allan Ashmead Tunley, Peterborough, England, assignor to Baker Perkins Limited, Peterborough, England Application December 12, 1945, Serial No. 634,478
In Great Britain December 19, 1944

5 Claims. (Cl. 107—7)

This invention relates to the transporting of goods such as sweetmeats, biscuits or the like, through a chocolate or like coating machine or enrober and delivery to the trays of an endless conveyor of a cooling plant, and particularly to a machine or plant wherein the coated goods are delivered on to plaques or flexible sheets as the latter are progressively brought up over a knife edge or nose, the loaded plaques being subsequently transferred to the trays of the cooling conveyor.

In such plant the goods have to be separated into batches which are spaced from one another according to the spacing of the trays of the cooler conveyor. Hitherto such batching and spacing has been effected prior to the passage of the goods through the coating machine or enrober. Spacing of the batches at this stage results in there being gaps between the trailing and leading ends of the plaques as they pass over the knife edge of the decorating table or conveyor on which the loaded plaques travel before transfer to the trays of the cooling conveyor. The result is that coated goods which straggle or are jolted out of their position in the batches come into contact with the knife edge which becomes fouled with chocolate, which also gets on the surface of the decorating table.

It is an object of the invention to provide an improved method of batching by which the above disadvantage will be avoided, an aim being to provide an arrangement whereby the knife edge of the decorating table or conveyor will always be covered by the succession of plaques as they are being loaded with the coated goods.

According to the invention the spacing is effected in two stages, the first stage prior to the passage of the goods through the enrober or coating machine and the second stage after coating and prior to or as the loaded plaques are transferred to the trays of the cooler conveyor.

The invention consists in a method of batching comprising spacing the adjacent batch of goods prior to the coating operation by an amount less than that required for the cooler trays, and increasing the batch spacing after coating and when the goods are on the plaques to provide a spacing conforming to that of the cooler conveyor tray spacing, the arrangement being such that the coated goods are delivered on to a continuous surface formed by the succession of plaques.

The spacing required in the second stage may be such that the plaques when receiving the coated goods abut end to end, or the adjacent ends may overlap.

The invention also consists in a plant of the character described in which the plaques travel over the decorating table or conveyor or part thereof at a rate less than the rate of travel of the cooler tray conveyor, whereby the loaded plaques are separated from one another the desired amount to provide the correct spacing.

The invention also consists in a plant of the character described wherein the plaques as they pass over the knife edge and the decorating table abut or overlap at their adjacent ends.

In the accompanying drawings:

Figures 1, 1a, 1b and 1c together form a somewhat diagrammatic elevation of the feeding end of a cooling plant for chocolate or like coated goods.

Figures 2, 2a, 2b and 2c together form a corresponding plan.

Figure 8:
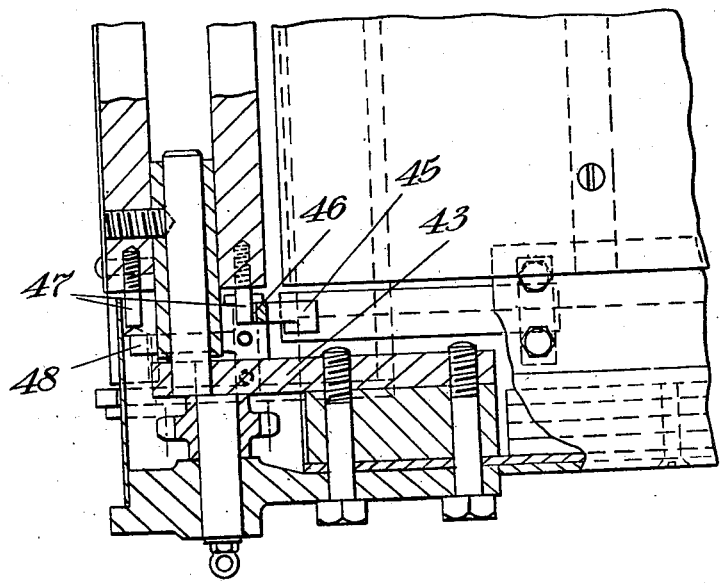
Figure 9:
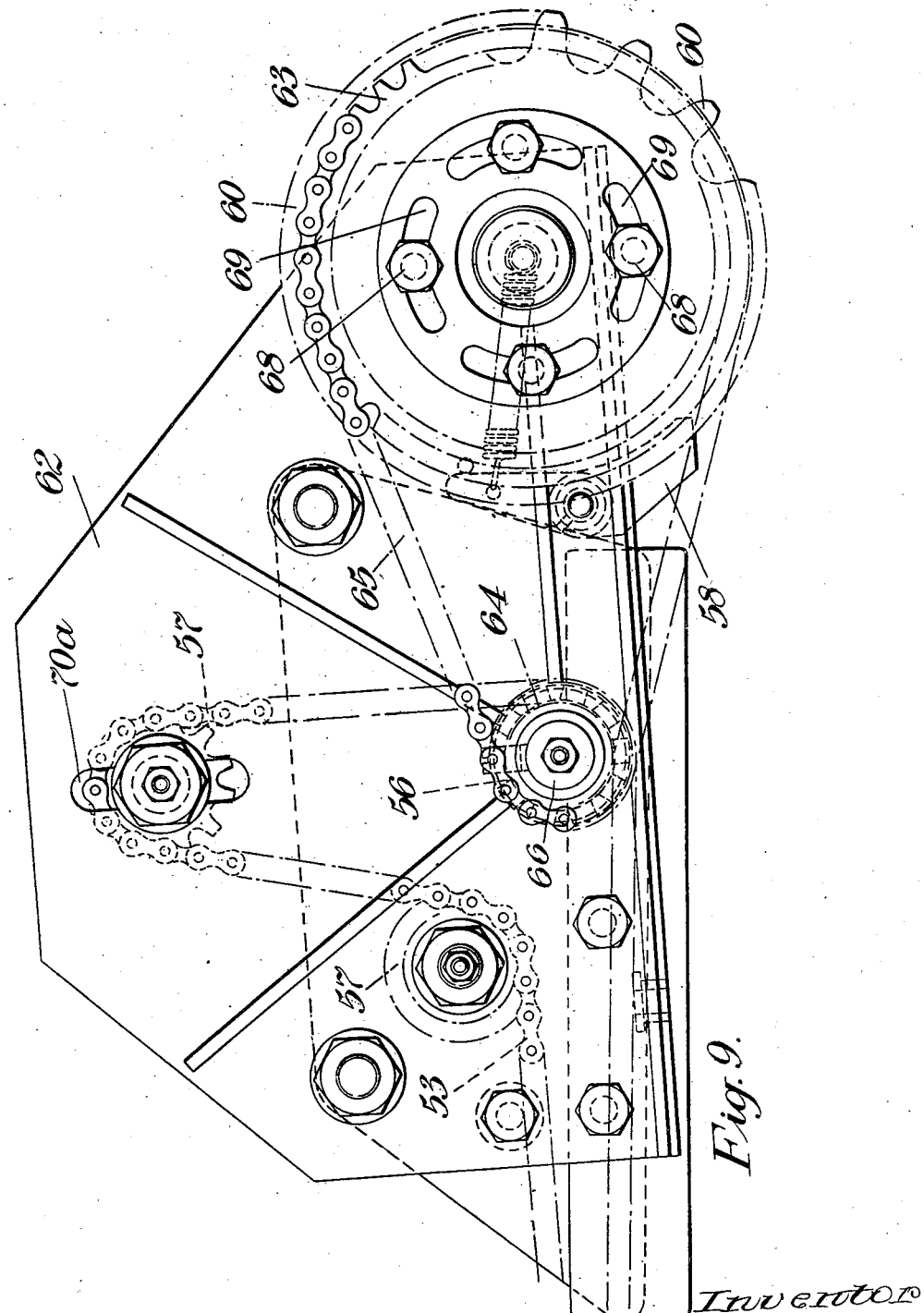
Figure 10:
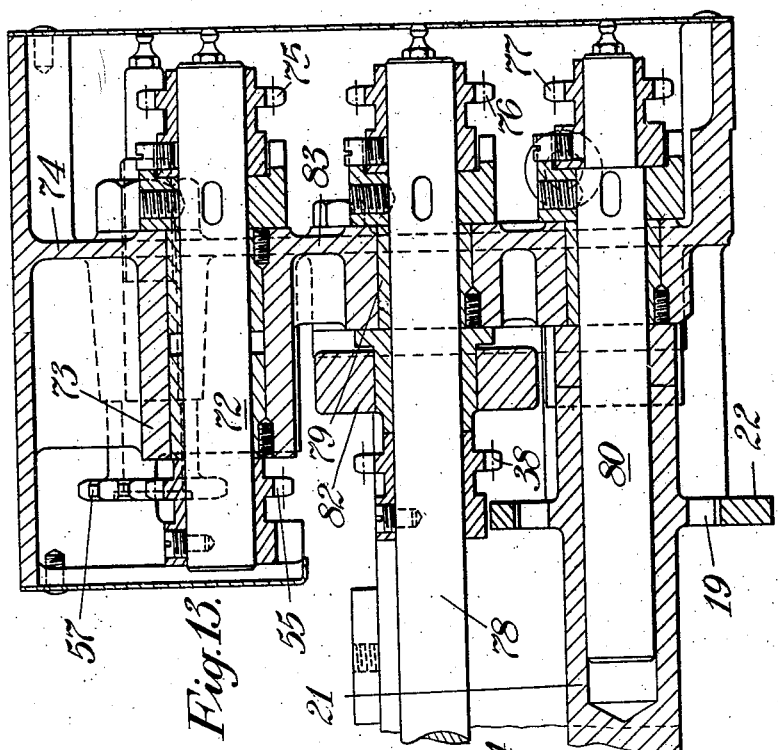
Figure 11:
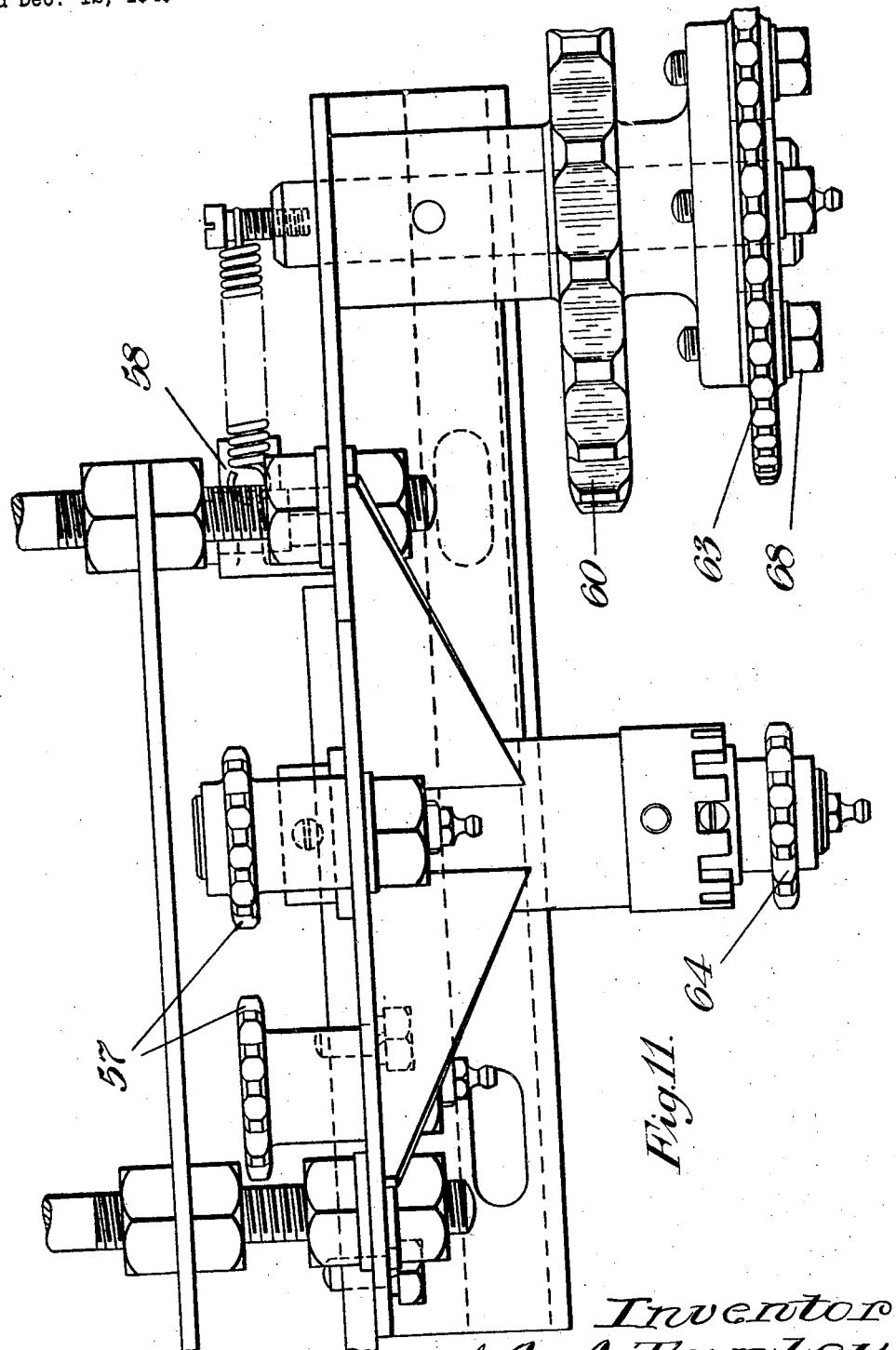

Figure 3 is a section on 3—3 of Figure 1.
Figure 4 is a section on 4—4 of Figure 1a.
Figure 5 is a section on 5—5 of Figure 1b.
Figure 6 is a section on 6—6 of Figure 1c.
Figure 7 is a sectional elevation, on an enlarged scale, showing details of the nose or knife edge.
Figure 8 is a corresponding sectional plan.
Figure 9 is a front elevation, on an enlarged scale, at the point of transference of the loaded plaques.
Figures 10 and 11 are corresponding sectional elevation and plan.
Figure 12 is an elevation, on an enlarged scale, at the point where separation of the loaded plaques commences, and
Figure 13 is a corresponding sectional elevation.

The invention will be described by way of example as applied to a cooling plant of the character described in British Patent Specification No. 553,309, in which the plaques are separated from the cooler conveyor trays on the return circuit and pass upwardly over the knife edge of the table for loading and are then again transferred to the trays at the delivery end of the table.

Referring to Figures 1c and 2c, the trays 1 are coupled by means of central rods 2 on both sides to conveying chains 3 which are supported and guided by tracks 4 on the horizontal runs, the tracks being carried upon angle members 5 which are mounted upon side frames 6 of the machine. The angle members 5 also form supporting tracks for forward and rear rollers 7 and 8 supported by rods 9 and 10 on the tray whereby the trays are maintained horizontal.

The trays are adapted to support flexible plaques 11 having driving rods 12 which are adapted to lie in slots 13 in driving plates or lugs 14 secured at the forward end of the tray on both sides thereof.

After the trays 1 with the loaded plaques have passed through the cooler which may be of any known form and the upward flight of which is indicated by the conveyor chain lap 3a, the plaques are unloaded in known manner and the trays 1 with the plaques travel along the return lap 3b and associated track. This lap passes upwardly around terminal guide sprockets 15 to a lap 3c where the plaques are removed from the trays.

During the passage of the trays from the lap 3b to the lap 3c, the trays are maintained level by the engagement of the rear rollers with the cam tracks 16, the forward rollers 7 passing through slots 17 in the track 5b. As the trays 1 pass along the lap 3c the plaque rods 12 ride up inclines 18 being driven by the vertical wall 14a of the tray plates 14 and enter the path of a rotary cam 19 whereby the rods pass around the groove 20 formed by a roller 21 and plate 22 so that the plaques 11 are removed from the trays. At the upper part of the grooves 20 the plaque rods 11 are caught up by dogs 23 on a plaque driving endless chain 24.

In their continued movement the empty trays 1 rise to the level of the track 5, the conveyor chains 3 passing around guide sprockets 25 and 26 to the upper lap 3d. During this rise the trays are maintained level by their forward and rear rollers 7 and 8 engaging respectively in the guide slot 27 and cam 28, the conveyor chain passing through a gap 29 in the track 5.

After rising to the level of the track 5 the trays travel on to a position where they receive a loaded plaque and thence on to the lap 3a of the cooler.

As the empty plaques are removed from the trays by the driving chains 24 they travel toward the loading position A being supported upside down by a series of transversely spaced slats 30 supported by transverse bars 31 forming stretchers of a table unit 32 comprising side channels 33 and a supporting surface or table 34. The laps of the chains 24 are supported by inwardly extending tracks 35, 36 and are mounted upon terminal sprockets 37, 38 of which 38 is the driving element. The table unit 32 is pivotally mounted on an axis coincident with the axis of the chain sprockets 38 so that its outer end may be adjusted in height to conform to the height of the enrober conveyor or band 39. When adjusted the table unit is fixed in position by bolting brackets 40 to the framing or machine supports 41.

At the feeding end the table unit 32 is provided with a knife edge or nose which in the construction shown comprises a rotary bridge piece 42 over which the plaques are drawn by the chains 24 whereby they receive the coated goods from the enrober band 39 and are then drawn on to and along the table 34. The spacing of the dogs 23 on the chains as compared with the length of the plaques is such that as successive plaques are drawn over the bridge piece, the trailing edge of one plaque abuts the leading edge of the next plaque so that in effect there is a continuous travelling surface covering the bridge piece so that any coated goods that may have become dislodged from the batches of goods received by the plaques will not contact with the bridge piece and the latter will not become fouled with the coating material.

The bridge piece 42 is mounted to rotate in bearing plate 43 secured to the table unit channels 33. The bridge piece lies in the path of the plaque rods which travel through cam grooves 44 in their passage around the nose and on to the table 34, the arrangement being such that the bridge piece is engaged by the plaque rods and turned to provide the necessary space for the rods between the table unit 32 and the enrober band 39 whereupon the space is again closed while the batch of goods is being transferred to the plaque. The bridge piece 42 is locked in its space closing position by means of a pivoted spring pressed trigger device 45 having a slot 46 adapted to engage pins 47 on the bridge piece. The trigger 45 has an arm 48 lying in the path of the plaque rods so that the trigger is moved by the rod to a position in which the bridge piece is released just prior to its being turned by the plaque rod. The cam grooves 44 are provided with a downward hump 49 which causes the plaque rods to bear upon the bridge piece to return it to its space closing position. In order to prevent the free trailing end of the plaque from springing upwardly a plate 50 engages the bridge piece.

Aligned with the table 34 of the table unit 32 is a table 51 located above the laps 3c and 3d of the tray conveyor. The table 51 is supported upon the flanges 52 of the side frames 6.

The loaded plaques are adapted to be drawn over the table 51 by side chains 53 having dogs 54 adapted to engage the plaque rods. The chains 53 pass around terminal sprockets 55 and 56 and guide sprockets 57. The sprockets 55 are located above the sprockets 38 of the dog chains 24. The speed of travel of the chains 53 is higher than that of the chains 24 but the spacing of the dogs 54 is greater than that of the dogs 23, such that when a dog 23 arrives at a position above the axis of the sprocket 38, a dog 54 on the chain 53 arrives immediately below the sprocket 55 with the result that the faster moving dogs 54 engage the plaque rods and draw the loaded plaques on to the table 51.

The table 51 slopes downwardly at its delivery end 51a (Figure 1c) to a position such that the plaque rods 12 when vertically below the axis of the sprockets 56 will be in a position to be engaged by the walls 14a of the tray plates or lugs 14 so that the continued travel of the loaded plaques will be caused by these lugs. The plaques will thus be drawn down the slope of the table on to the trays. The table 51 is cut away at 51b (Figure 2b) to allow the lugs 14 to engage the plaque rods 12. In order to ensure proper positioning of the plaque rods in the slots 13 of the tray plates 14 pivoted spring pressed levers 58 lie in the path of the plaque rods and act to press the rods downwardly.

After the loaded plaques are transferred to the trays they travel upwardly into the cooling tier along the path 3a. The chains 53 are accommodated in channel members 59 (Figure 5) arranged along the edges of the table 51.

The driving arrangements for the dog chains 24 and 53 are similar on both sides of the machine so that only those on one side will be described.

The drive is taken from the conveyor chain 3 by a sprocket 60 (Figures 2c, 6, 9 and 10) mounted to rotate freely on a stub shaft 61 supported in a side plate 62. The sprocket 60 is adjustably fastened by bolts 68 and slots 69 to a sprocket 63 which drives a sprocket 64 by a chain 65. The sprocket 64 is secured to a shaft 66 in a bearing 67 mounted in the frame. At its inner end the shaft 66 carries the sprocket 56 which drives the dog chain 53. The upper guide sprocket 57 (Figure 10) is mounted on a pin 70 adjustable in a slot 70a in the plate 62 for adjusting the tension of the dog chain 53. The plate 62 is mounted upon the side frame 6.

By driving the dog chain 53 from the conveyor chain 3 through the chain 65 it will be appreciated that the rate of travel of the dog chain 53 may be the same as that of the conveyor chain in which case the spacing of the dogs 54 will conform to the spacing of the trays 1.

The terminal sprocket 55 of the dog chain 53 is mounted upon a shaft 72 carried in a bearing 73 on the plate 74. On the outer end of the shaft 72 a sprocket 75 is secured which drives through a chain 75a two sprockets 76 and 77. The sprocket 76 is secured on the end of a shaft 78 having bearings 79 and which extends across the machine and also has keyed thereto the driving sprockets 38 of the dog chains 24.

The sprocket 77 is secured to a short shaft 80 which telescopes into and is secured to the roll 21. The roll 21 has integral therewith the cam 19 which rotates within the opening 81 of the plate 22.

It is to be noted that the sprocket 75 is smaller in diameter than the sprocket 55 whereby the rate of travel of the dog chain 24 is lower than that of the dog chain 53.

Surrounding the shaft 78 adjacent the sprocket 38 is a mounting bracket 82 by which the adjacent end of the table unit 32 is supported.

The bearings for the shafts 72, 78 and roll 21 are carried by side plates 83 supported upon the side frames 6 of the machine. The side plates 83 are connected by a stretcher element 84.

As mentioned above the rate of travel of the dog chains 53 is the same as that of the tray conveyor chains 3 while the rate of travel of the dog chains 24 is lower. The rate of travel of the dog chains 24 is such that when the plaques are under control of the dogs 23 and are driven thereby adjacent trailing and leading ends of successive plaques abut one another with the result that the nose of the table unit 32 is always covered.

When the plaque rod of a loaded plaque comes within the influence of the dog chains 53 and is engaged by the dogs 54 thereof the rate of the travel of the plaque is increased so that a spacing of the plaque from the succeeding plaque which is still being driven by the dog chains 24 is effected.

The spacing of the batches of goods carried by the plaques is thus brought into conformity with the tray spacing.

It will be appreciated that in loading coated goods on to plaques in a machine of the character described it is essential that the goods before passing through the enrober must be arranged in spaced batches in order to avoid the plaque rods, and so that the batches are properly located in the trays. As the plaques according to the present invention are initially abutting one another when being loaded it therefore follows that the spacing of the batches as delivered to the plaques will be of less dimension than when the loaded plaques are transferred to the trays. This initial batching of the goods may be carried out in any convenient known manner.

Thus, for example, where the batches of goods are 43" long with a 7" spacing to suit cooler trays at 50" pitch, the initial or first stage of the batching may produce a spacing of 5" leaving the remaining 2" to be produced when the loaded plaques are separated by the faster moving dog chains 53.

While it is preferred to effect the second stage of the batch spacing by the provision of two sets of dog chains travelling at different rates so that the loaded plaques when transferred to the conveyor trays are travelling at the same rate as the tray, a single set of dog chains travelling at the appropriate lower rate may advance the loaded plaques to the delivery end of the table whereupon the faster moving trays engage the plaque rods and cause the separation of the plaques.

In the machine above described the plaques when being loaded abut one another. If desired, however, by making the initial batch spacing smaller the adjacent ends of the plaques may be caused to overlap with the trailing end of one plaque either above or below the leading end of the previous plaque.

In the case of the trailing end being covered by the leading end of the next plaque, such trailing end will be prevented from flipping up as it passes over the nose or knife edge.

What I claim is:

1. A machine for transferring coated confections in spaced batches from a conveyor apron of an enrober to the spaced trays of a travelling cooling conveyor, comprising in combination, means for advancing the trays in spaced relation along a predetermined path, a series of flexible plaques, a plaque supporting surface having an edge located adjacent the delivery end of said conveyor apron, means for moving successive plaques upwardly around said edge to receive goods from said apron and along said supporting surface at a rate of travel and a pitch spacing less than those of said trays such that adjacent edges of successive plaques abut whereby the edge of said supporting surface is covered, means for increasing the rate of travel of the loaded plaques to equal that of the trays whereby the plaques are spaced from one another, and means for delivering the spaced plaques to the trays.

2. A machine for transferring coated confections in spaced batches from a conveyor apron of an enrober to the spaced trays of a travelling cooling conveyor, comprising in combination, means for advancing the trays in spaced relation along a predetermined path, a series of flexible plaques, a plaque supporting surface having an edge located adjacent the delivery end of said conveyor apron, means for moving successive plaques upwardly around said edge to receive goods from said apron and along said supporting surface at a rate of travel and a pitch spacing less than those of said trays such that adjacent edges of successive plaques overlap whereby the edge of said supporting surface is covered, means for increasing the rate of travel of the loaded plaques to equal that of the trays whereby the plaques are spaced from one another, and means for delivering the spaced plaques to the trays.

3. A machine for transferring coated confections in spaced batches from a conveyor apron of an enrober to the spaced trays of a travelling cooling conveyor, comprising in combination means for advancing the trays in spaced relation along a predetermined path, a series of flexible plaques having driving rods, a plaque supporting table having an edge located adjacent the delivery end of said conveyor apron, a first means comprising endless chains having spaced dogs for engaging said rods to move successive plaques around said edge to receive goods from said apron and along said table, means for driving said first means at a rate of travel and with a pitch spacing less than those of said trays such that adjacent edges of successive plaques abut whereby said edge is covered, a second means comprising endless chains having spaced dogs for engaging said rods, the chains of said first and second means having overlapping portions, means for driving said second means at a rate of travel equal to that of the trays whereby the dogs of the chains of said second means engage the said rods at the overlapping portions and increase the rate of travel of the loaded plaques whereby the plaques are spaced from one another, and means for delivering the spaced plaques to the trays.

4. In a machine as claimed in claim 3, ramps adjacent said predetermined path of the trays on to which the plaque rods are moved by the travelling trays, rotary cam means located adjacent the ramps for engaging the plaque rods and moving them to a position for engagement by the dogs of the first driving means.

5. In a machine as claimed in claim 3, means for removing the empty plaques from the trays comprising ramps adjacent said predetermined path of the trays and up which the plaque rods are moved by the movement of the trays, upwardly curved tracks for the plaque rods connected to said ramps and terminating at a point adjacent the path of the dogs of the first driving means, and rotary cams located within said tracks for moving the plaque rods along said tracks and into the path of said dogs.

ALLAN ASHMEAD TUNLEY.

REFERENCES CITED

The following references are of record in the file of this patent:

UNITED STATES PATENTS

| Number | Name | Date |
| --- | --- | --- |
| 1,160,792 | Van Houten | Nov. 16, 1915 |
| 1,672,522 | Greer et al. | June 5, 1928 |
| 1,703,881 | Greer | Mar. 5, 1929 |
| 1,807,338 | Greer | May 26, 1931 |
| 1,936,893 | Werner et al. | Nov. 28, 1933 |

FOREIGN PATENTS

| Number | Country | Date |
| --- | --- | --- |
| 328,915 | Great Britain | Apr. 30, 1930 |